United States Patent Office 3,261,864
Patented July 19, 1966

3,261,864
PROCESS FOR PREPARING α-CHLOROCARBONIC ACID HALIDES
Walter Fink, Zurich, Switzerland, assignor to Monsanto Company, a corporation of Delaware
No Drawing. Filed Apr. 30, 1962, Ser. No. 191,316
Claims priority, application Switzerland, May 5, 1961, 5,349/61
8 Claims. (Cl. 260—544)

The present invention relates to the manufacture of α-chlorocarbonic acid halides having the general formula $$R^1R^2CClCOX$$

In this formula $R^1$ and $R^2$ signify hydrogen atoms, halogen atoms, aliphatic, cycloaliphatic, araliphatic, aromatic or heterocyclic radicals which can be substituted, or $R^1$ and $R^2$ taken together form a cyclic structure, e.g. cycloaliphatic or heterocyclic radicals having from 5 to 8 carbon atoms in a ring, and X is a fluorine, chlorine or bromine atom. Normally, it is preferred that $R^1$ and $R^2$ each contain not more than 24 carbon atoms, more preferably not more than about 12 carbon atoms.

The α-chlorocarbonic acid halides described above are obtained by the reaction of chloronitrate and α-olefins which possesses on an ethylenically bonded carbon atoms standing at the end, two halogen atoms. Thus, the starting compounds are characterized by the presence of the grouping $$R^1R^2C=CX_2$$

When $R^1$ and $R^2$ are hydrocarbon or heterocyclic radicals, they can bear, for example, halogen, OR, CN, CO, COX, COOH, COOR, $NO_2$, $SO_2$, $NR_2$ or other substituents which are capable of enduring the oxidation power of $ClNO_3$. Moreover, other $C=CX_2$ groups may be present.

Suitable starting compounds are, for example, 1-dichloroethylene, 1,2-trichloroethylene, 1,2-tetrachloroethylene, the corresponding fluoro- or bromo-analogues, the corresponding analogues which contain mixed halogen atoms, and the existing derivatives which in place of one or two of the hydrogen or halogen atoms, possess optional hydrocarbon or heterocyclic radicals, possibly being unsaturated and/or substituted. Simple examples of such derivatives are 1-dichloropropylene, 1,2-trichloropropylene, 1 - dichloro - iso - propylene, 1-dichlorobutene, 1-dichlorobutadiene, 1-dichlorohexene, β-dichlorostyrene, α,β-trichlorostyrene, etc.

When the starting compound has more than one olefinically bonded and doubly halogenated carbon atom at the end, there can be formed the corresponding di- and tri-carbonic acid halides in case the amount of chloronitrate is correspondingly proportioned.

The chloronitrate necessary in the reaction can be obtained, for example, quantitatively by the reaction of nitrogen pentoxide and chlorine monoxide at low temperatures according to the following equation:

$$N_2O_5+Cl_2O \rightarrow 2ClNO_3$$

(M. Schmeisser, W. Fink and K. Brändle, Angew. Chem. 69, 780, 1957).

The process of invention occurs in two steps. At first, $ClNO_3$ is added to the double bond. Thereby the entry of the $NO_3$ group into the molecule of the herein used starting compounds is always at the halogen-richest carbon atom, i.e. the terminal carbon atom of the vinyl group $$R^1R^2C=CX_2+ClNO_3 \rightarrow R^1R^2CClCX_2NO_3$$

In the second reaction step the nitrate compound is decomposed with formation of halogen nitrite and carbonic acid halogenide $$R^1R^2CClCX_2NO_3 \rightarrow R^1R^2CClCX=O+NO_2X$$

Because of the instability of those nitrate compounds which contain on the same carbon atom 1 nitrate group and 2 halogen atoms, both reaction steps occur simultaneously and thus, the preparation of α-chlorocarbonic acid halides can be carried out in one operation.

A chlorine atom is always introduced into the starting compound and that chlorine atom will be maintained in the α-position to the formed carbonyl group, as may be seen from the equations. Apart from this chlorine atom which is always present, as mentioned before, other chlorine, bromine, iodine and/or fluorine atoms can be present in optional positions which are possible in the end products.

The kind of halogen atom in the resulting carbonic acid halide group depends on the halogen atoms which are attached to the unsaturated carbon atom standing at the end. When these are, for example, fluorine atoms one obtains carbonic acid fluorides.

The decomposition of the nitrate compound is dependent on the temperature. It occurs with derivatives of fluoroolefines readily at −80° C. and with derivatives of chloroolefines at about 0° C. But, the reaction temperature is also governed by the number of halgen atoms on the ethylenically unsaturated β-carbon atom. Thus, for example, $CHCl=CCl_2$ reacts readily at room temperature or below, while $CCl_2=CCl_2$ does not react under the same conditions. In the latter case, one must work in an acid resistant autoclave under weak pressure (1–4 atmosphere) and preferably at some higher temperature (25–35° C.). Fluorinated ethylene or ethylene derivatives, to the contrary, are reacted without application of pressure, since danger of explosion persists. Suitable materials for the necessary apparatus are, for example, glass, ceramic, nickel, nickel alloys, stainless steel, ingot steel, certain synthetic plastic compositions, etc.

The compounds in which the carbonyl halogenide group (—COX) is attached to a perhalogenalkyl are especially important. Starting compounds for such products are, for example, $CF_2=CF_2$, $CF_2=CFCl$, $$CF_3(-CF_3)_n-CF=CF_2$$

($n$=zero or an integer up to 20), etc. The terminal unsaturated $=CF_2$ group in these cases is converted into a carbonyl fluoride group. The compound $ClCF_2COX$ is a particularly useful intermediate product.

Polyhalogenodienes can also be reacted in similar manner. Examples are $CF_2=CF-CF=CF_2$, $$CF_2=CF-CH=CH_2$$

$CF_2=CCl-CH=CH_2$, $CFCl=CF-CF=CH_2$, etc. The conjugated dienes can also add the chloronitrate in 1,4-position, according as is the structure and as are present substituents. But, in such cases the terminal $=CF_2$ group is still converted into a carbonyl halogenide group.

When vinyl (—CH=$CH_2$) or vinylene (—CH=CH—) groups which are free of halogen are simultaneously present, these can also add chloronitrate and form stable derivatives of the carbonic acid halides, such as, for example, $CH_2NO_3CHClCH_2CH_2COX$. Furthermore, such unsaturated groups can also react in similar manner with the nitrogen compounds which appear as by-products, especially with $ClNO_2$. It has further been found that the halogenated vinyl and vinylene groups of the formula —CX=CH—, —CX=CX— or —CX=$CH_2$ can be converted on the treatment with chloronitrate into the corresponding ketone configurations —CO—CHCl—, —CO—CClX— or —CO—$CH_2$Cl.

Nevertheless, with the starting compounds defined at beginning, in the reaction of the invention always are obtained carbonic acid halides which, depending on the circumstances, in addition to a chlorine atom and a carbonyl halogenide group introduced by the reaction, contain also nitro, nitrite, nitrate or keto groups as novel substituents.

The carbonic acid halides are valuable intermediate products. There can be prepared by known ways esters, amides, metal and ammonia salts thereof. It is not necessary to isolate the carbonic acid halides if they are to be used for preparing the corresponding acids. The perfluorocarbonic acids having 2–12 carbon atoms and which possess from the reaction yet a chlorine atom are of great importance from the technical point of view. The higher homologues are surface-active and their perfluoroalkyl, perhalogenoalkyl respectively, molecule part displays hydrophobic as well as oleophobic properties.

Example 1

In a bomb tube is made a mixture consisting of 13.54 g. (0.081 mole) of $CCl_2$=$CCl_2$ and 9.0 g. (0.092 mole) of $ClNO_3$. The tube is cooled to −180° C., evacuated, sealed and agitated for 4 hours at 25–29° C. After the tube has been opened it is warmed up to 40–50° C. for 15 minutes, thereby $ClNO_2$ evolves. Then, the mixture is distilled using a flask.

Yield 14.3 g. of trichloroacetic acid chloride (=96.3% of the theory); B.P. 115–119° C./720 mm.

*Analysis.*—Percent C calculated: 13.21. Percent C found: 13.02. Molecular weight calculated: 181.85. Molecular weight found: 174.5.

In this reaction there are formed as by-products small amounts of $CCl_3CCl_2NO_2$, which can be detected by the infra-red spectrum.

Example 2

To a solution of 11.64 g. (0.088 mole) of $CHCl$=$CCl_2$ in 10 ml. of $CCl_3F$ (Frigen 11) is added a solution of 8.7 g. (0.09 mole) of $ClNO_3$ in Frigen 11 (1:1) at 18° C. An exothermic reaction occurs with formation of $NO_2$ and $NO_2Cl$ as co-product. After the reaction is completed the mixture is refluxed for 2 hours and the $CCl_3F$ is distilled off. Then, the reaction product is fractionally distilled.

Yield 10.2 g. of dichloroacetic acid chloride (=77% of the theory).

*Analysis.*—Molecular weight calculated: 147.4. Molecular weight found: 138.5.

The infra-red spectrum is identical with that of $CHCl_2COCl$.

Example 3

To 10.0 g. (0.085 mole) of $CF_2$=$CClF$ are added 8.7 g. (0.09 mole) of $ClNO_3$ at −30/−40° C., and a white solid compound appears ($N_2O_5$). After the reaction is completed, the reaction mixture is slowly heated up to +50° C. using a reflux condenser, and the $N_2O_5$ is decomposed. The remaining liquid is fractionally distilled.

Yield 4.5 g. of dichlorofluoroacetic acid fluoride (=35.2% of the theory); B.P. 38–42° C./720 mm.

*Analysis.*—The infra-red spectrum is identical with that of $CCl_2FCOF$.

What is claimed is:

1. A process for making α-chlorocarbonic acid halides of the formula $R^1R^2CClCOX$ wherein $R^1$ is a halogen atom and $R^2$ is selected from the class consisting of hydrogen atoms, halogen atoms and $CF_3$(—$CF_2$)$_n$— wherein $n$ is an integer from 0 to 20, and X is selected from the class consisting of fluorine, chlorine and bromine atoms, comprising reacting olefinic compound of the formula $R^1R^2C$=$CX_2$ with $ClNO_3$ at a temperature at which addition will occur across the olefinic double bond and adjusting the temperature to a temperature at which the formed chloronitrate addition product will decompose and give off halonitrite.

2. A process of claim 1 wherein said olefinic compound is of the formula $CF_3$(—$CF_2$)$_n$—$CF$=$CX_2$ and $n$ is an integer from 0 to 20, and said acid halide is of the formula $CF_3$(—$CF_2$)$_n$—$CFClCOX$.

3. A process of claim 1 wherein the chloronitrate addition is carried out at a temperature in the range of −80° to 35° C. and the decomposition of the chloronitrate addition product is carried out at a temperature in the range of −80° to 50° C.

4. A process of claim 3 wherein said olefinic compound is of the formula $CHCl$=$CCl_2$ and said acid halide is $CHCl_2COCl$.

5. A process of claim 1 wherein said olefinic compound is of the formula $X_2C$=$CX_2$ and said acid halide is of the formula $CX_2ClCOX$.

6. A process of claim 5 wherein the chloronitrate addition is carried out at a temperature in the range of −80° to 35° C. and the decomposition of the chloronitrate addition product is carried out at a temperature in the range of −80° to 50° C.

7. A process of claim 6 wherein said olefinic compound is of the formula $CCl_2$=$CCl_2$ and said acid halide is $CCl_3COCl$.

8. A process of claim 6 wherein said olefinic compound is of the formula $CF_2$=$CClF$ and said acid halide is $CCl_2FCOF$.

References Cited by the Examiner

Boschan et al.: "Chem. Rev.," vol. 55, 1955, pp. 485–510.

Houben-Weyl: "Methoden der Org. Chem.," vol. 5/3 (1962), pp. 934–943.

Merz: "Deut. Chem. Ber.," vol. 93 (1960), pp. 2300–2308.

Skiens et al.: "J. Am. Chem. Soc.," vol. 80 (1958), pp. 5640–5645.

LORRAINE A. WEINBERGER, *Primary Examiner.*

C. B. PARKER, *Examiner.*

R. K. JACKSON, *Assistant Examiner.*